(12) United States Patent
Murata et al.

(10) Patent No.: US 10,942,411 B2
(45) Date of Patent: Mar. 9, 2021

(54) LIQUID CRYSTAL DISPLAY DEVICE

(71) Applicant: SHARP KABUSHIKI KAISHA, Sakai (JP)

(72) Inventors: Koji Murata, Sakai (JP); Hidefumi Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/785,944

(22) Filed: Feb. 10, 2020

(65) Prior Publication Data

US 2020/0257143 A1    Aug. 13, 2020

Related U.S. Application Data

(60) Provisional application No. 62/804,650, filed on Feb. 12, 2019.

(51) Int. Cl.
| | | |
|---|---|---|
| *G02F 1/133* | (2006.01) | |
| *G02F 1/137* | (2006.01) | |
| *G02F 1/1343* | (2006.01) | |
| *G02F 1/1368* | (2006.01) | |

(52) U.S. Cl.
CPC ............ *G02F 1/137* (2013.01); *G02F 1/1368* (2013.01); *G02F 1/134309* (2013.01); *G02F 2201/121* (2013.01); *G02F 2201/123* (2013.01)

(58) Field of Classification Search
CPC .................................................... G02F 1/1368
See application file for complete search history.

(56) References Cited

U.S. PATENT DOCUMENTS

| | | | | |
|---|---|---|---|---|
| 2014/0267964 A1* | 9/2014 | Iyama | .................. | G02F 1/13306 349/33 |
| 2016/0299394 A1* | 10/2016 | Yoshida | ............ | G02F 1/133345 |

FOREIGN PATENT DOCUMENTS

WO        2015/083401 A1    6/2015

* cited by examiner

*Primary Examiner* — Sang V Nguyen
(74) *Attorney, Agent, or Firm* — ScienBiziP, P.C.

(57) ABSTRACT

A liquid crystal display device of the present invention includes: a first substrate including a pair of counter electrodes; a second substrate including a pixel electrode and a common electrode; and a liquid crystal layer that includes liquid crystal molecules aligned horizontally with the substrates. The liquid crystal display device is configured to perform display in any of multiple display modes. The multiple display modes include: a first display mode of performing display in a first state where an alternating-current voltage is applied at a first frequency between the pair of counter electrodes; and a second display mode of performing display in at least one of a second state where no voltage is applied between the pair of counter electrodes, or a third state where an alternating-current voltage is applied at a second frequency that is higher than the first frequency between the pair of counter electrodes.

4 Claims, 6 Drawing Sheets

Example1

Example4

Example12-1

Example12-2

Example12-3

Example12-4

LIQUID CRYSTAL DISPLAY DEVICE

CROSS-REFERENCE TO RELATED APPLICATIONS

The present application claims priority under 35 U.S.C. § 119 to U.S. Provisional Application No. 62/804,650 filed on Feb. 12, 2019, the contents of which are incorporated herein by reference in their entirety.

BACKGROUND OF THE INVENTION

Field of the Invention

The present invention relates to a liquid crystal display device. More particularly, the present invention relates to a liquid crystal display device in a horizontal alignment mode.

Description of Related Art

Liquid crystal display devices are display devices that use a liquid crystal composition for display, and a typical display method for the devices is adapted to apply a voltage to a liquid crystal composition sealed between a pair of substrates to change the alignment state of the liquid crystal molecules in the liquid crystal composition depending on the applied voltage, thereby controlling the amount of transmitted light. Such liquid crystal display devices are used in a wide range of fields, taking advantage features such as thinness, light weight, and low power consumption.

As a display method for liquid crystal display devices, the horizontal alignment mode of controlling by rotating the alignment of liquid crystal molecules mainly in a plane parallel to a substrate surface has been attracting attention for reasons such as that it is easy to obtain wide viewing angle characteristics. For example, in recent years, an in-plane switching (IPS) mode, which is a type of horizontal alignment mode, and a fringe field switching (FFS) mode are widely used in liquid crystal display devices for smartphones and tablet terminals.

As a technique related to a horizontal alignment mode liquid crystal display device, for example, International Publication No. 2015/083401 discloses a liquid crystal display device including: a first substrate with a pair of electrodes; a second substrate with a switching element, a pixel electrode electrically connected to the switching element, and a common electrode; and a liquid crystal layer that is disposed between the first substrate and the second substrate and includes liquid crystal molecules aligned horizontally with respect to the first substrate and the second substrate, where at least one of the pair of electrodes has a first linear part extending in a first direction, at least one of the pixel electrode or the common electrode has a second linear part extending in a second direction that intersects with the first direction, the liquid crystal molecules are aligned perpendicularly or parallel to the first direction in a first display state where a voltage is applied between the pair of electrodes, whereas no voltage is applied between the pixel electrode and the common electrode, and the liquid crystal molecules are aligned in a direction that is different from the alignment direction in the first display state in a second display state where a voltage is applied between the pair of electrodes, and a voltage is applied between the pixel electrode and the common electrode.

BRIEF SUMMARY OF THE INVENTION

In the liquid crystal display device in International Publication No. 2015/083401, a voltage of, for example, 10 V or higher and 100 V or lower is applied between the pair of electrodes in any of a first display state where no voltage is applied between the pixel electrode and the common electrode and a second display state where a voltage is applied between the pixel electrode and the common electrode. Such a liquid crystal display device is suitable particularly for a head mounted display (hereinafter, also referred to as a HMD) application where a high-speed response is desired.

In recent years, smartphones have been developed which can be also used as an HMD by attaching the smartphones to heads with the use of simple attachments. In this regard, the liquid crystal display device in International Publication No. 2015/083401 is suitable for HMD applications because the device has high-speed responsivity, but the liquid crystal display device is not suitable for smartphone applications because the device is low in luminance. For that reason, there has been a demand for a liquid crystal display device which can be used for both HMD applications and smartphone applications.

The present invention has been achieved in view of the current situation mentioned above, and it is also an object of the invention to provide a liquid crystal display device capable of switching between a display mode that can provide improved response speed and a display mode that can provide improved luminance.

(1) An embodiment of the present invention is a liquid crystal display device including: a first substrate including a pair of counter electrodes; a second substrate including a switching element, a pixel electrode connected to the switching element, and a common electrode, the second substrate being disposed to be opposed to the first substrate; an alternating-current voltage application unit connected to the pair of counter electrodes; and a liquid crystal layer that is disposed between the first substrate and the second substrate and includes liquid crystal molecules aligned horizontally with respect to the first substrate and the second substrate, the liquid crystal display device being configured to perform display in any of multiple display modes, where at least one of the pair of counter electrodes includes a first linear part extending in a first direction, at least one of the pixel electrode or the common electrode includes a second linear part extending in a second direction that intersects with the first direction, and the multiple display modes include: a first display mode of performing display in a first state where an alternating-current voltage is applied at a first frequency between the pair of counter electrodes; and a second display mode of performing display in at least one of a second state where no voltage is applied between the pair of counter electrodes, or a third state where an alternating-current voltage is applied at a second frequency that is higher than the first frequency between the pair of counter electrodes.

(2) Furthermore, an embodiment of the present invention is a liquid crystal display device where, in addition to the configuration of (1), the first frequency is a frequency of 240 Hz or lower.

(3) Furthermore, an embodiment of the present invention is a liquid crystal display device where, in addition to the configuration of (1) or (2), the second frequency is a frequency of 300 Hz or higher.

(4) Furthermore, an embodiment of the present invention is a liquid crystal display device where, in addition to the configuration of (1), (2) or (3), the second frequency and the effective value of the alternating-current voltage in the third state satisfy the relation of the following formula 1.

$$HS \geq 38 \times VS^2 - 110 \times VS + 286 \qquad \text{(Formula 1)}$$

(In the formula 1, HS represents the second frequency in the third state, and VS represents the effective value of the alternating-current voltage in the third state.)

(5) Furthermore, an embodiment of the present invention is a liquid crystal display device where, in addition to the configuration of (1), (2), (3) or (4), the alternating-current voltage is applied between the pair of counter electrodes in synchronization with a voltage applied between the pixel electrode and the common electrode in the first display mode.

According to the present invention, a liquid crystal display device can be provided which is capable of switching between a display mode that can provide improved response speed and a display mode that can provide improved luminance.

DETAILED DESCRIPTION OF THE INVENTION

Figure 1:
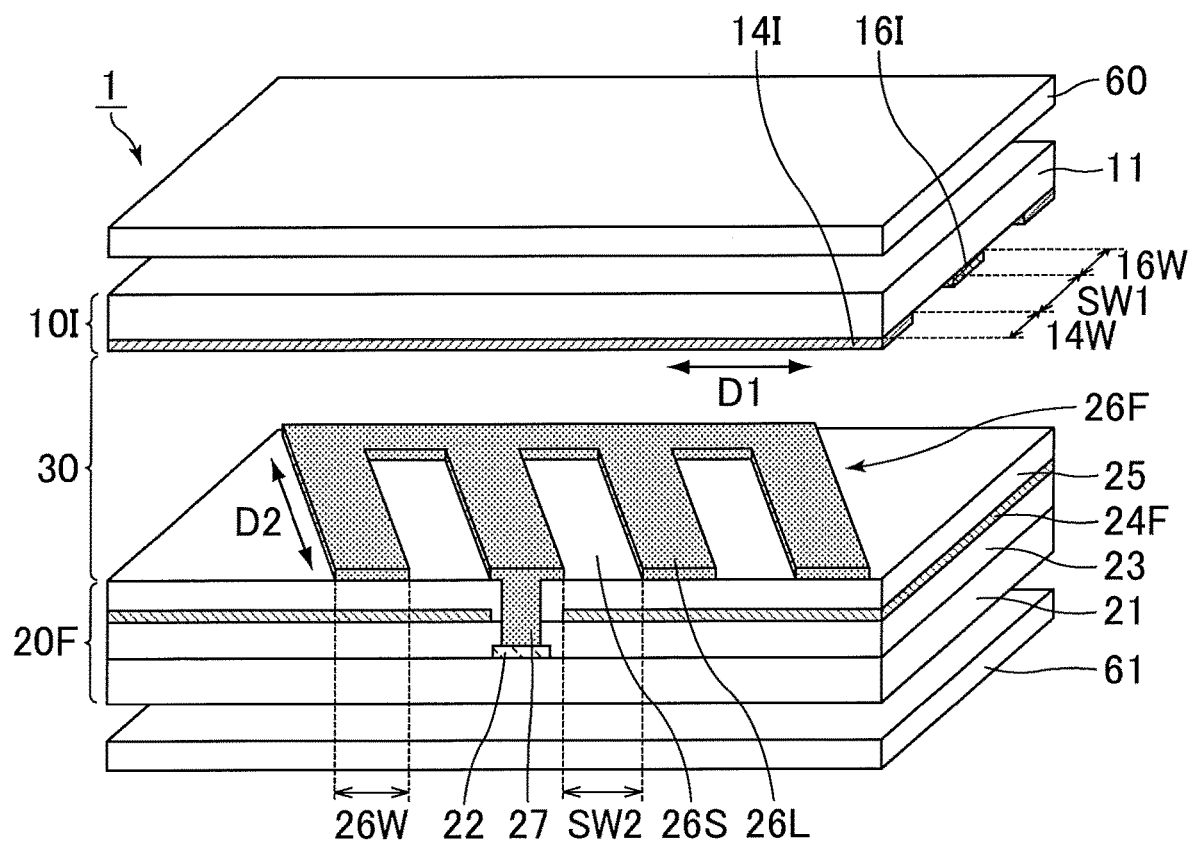
FIG. 1 is a schematic perspective view of a liquid crystal display device according to Embodiment 1.

Embodiments of the present invention will be described below. The present invention is not to be considered limited to the contents described in the following embodiments, and appropriate design changes can be made within a range that satisfies the configuration of the present invention.

A liquid crystal display device according to an embodiment of the present invention is a liquid crystal display device including a first substrate with a pair of counter electrodes, a second substrate including a switching element, a pixel electrode connected to the switching element, and a common electrode, the second substrate being disposed to be opposed to the first substrate, an alternating-current voltage application unit connected to the pair of counter electrodes, and a liquid crystal layer that is disposed between the first substrate and the second substrate and includes liquid crystal molecules aligned horizontally with respect to the first substrate and the second substrate, the liquid crystal display device being configured to perform display in any one of multiple display modes. At least one of the pair of counter electrodes has a first linear part extending in a first direction, and at least one of the pixel electrode or the common electrode has a second linear part extending in a second direction that intersects with the first direction. The multiple display modes include: a first display mode of performing display in a first state where the alternating-current voltage application unit applies an alternating-current voltage at a first frequency between the pair of counter electrodes; and a second display mode of performing display in at least one of a second state where no voltage is applied between the pair of counter electrodes, or a third state where the alternating-current voltage application unit applies an alternating-current voltage between the pair of counter electrodes at a second frequency that is higher than the first frequency.

In the first state provided in the liquid crystal display device according to the present embodiment, an alternating-current voltage is applied at a first frequency between the pair of counter electrodes, in any of a state (hereinafter, also referred to as a voltage application state) where a voltage is applied between the pixel electrode and the common electrode and a state (hereinafter, also referred to as a non-voltage application state) where no voltage is applied, thus allowing the electric field from the first substrate to generate a force for forcible alignment regulation on the liquid crystal molecules. As a result, the response speed can be improved. Thus, in the case of changing from the non-voltage application state to the voltage application state, the liquid crystal molecules near the first substrate are immobilized by the electric field from the first substrate to cause only some of the liquid crystal molecules to respond, thus allowing the response speed to be increased. Furthermore, in the case of changing from the voltage application state to the non-voltage application state, the liquid crystal molecules are forced to return the alignment quickly by the electric field from the first substrate, thus allowing the response speed to be improved. As just described, in the first state, the response speed can be improved in both switching from the non-voltage application state to the voltage application state and switching from the voltage application state to the non-voltage application state.

In the second state provided in the liquid crystal display device according to the present embodiment, the electric field from the first substrate is not generated. Thus, in switching from the non-voltage application state to the voltage application state, the alignment of liquid crystal molecules is regulated by the electric field from the second substrate. Furthermore, in switching from the voltage application state to the non-voltage application state, the alignment of the liquid crystal molecules is regulated only by the alignment regulating force of the first and second substrate surfaces. In this regard, in the first state, the liquid crystal molecules near the first substrate are fixed under the influence of the electric field from the first substrate, and there are liquid crystal molecules that do not move in the switching between the non-voltage application state and the voltage application state. Thus, the luminance may decrease. In the second state, however, the electric field from the first substrate is not generated, thus allowing more liquid crystal molecules to respond in switching between the non-voltage application state and the voltage application state. Thus, the luminance can be improved.

Furthermore, in the third state provided in the liquid crystal display device according to the present embodiment, the electric field from the first substrate is generated in both the non-voltage application state and the voltage application state. In this regard, the second frequency of the alternating-current voltage applied between the pair of counter electrodes in the third state is higher than the first frequency of the alternating-current voltage applied between the pair of counter electrodes in the first state. When the frequency of the alternating-current voltage applied between the pair of counter electrodes is increased, the liquid crystal molecules fail to follow the electric field generated by the applied alternating-current voltage, and then more easily translate and diffuse. As a result, the liquid crystal molecules are more likely to fluctuate (more likely to be loosened), thereby allowing more liquid crystal molecules to respond in switching between the non-voltage application state and the voltage application state. Thus, the luminance can be improved.

As just described, the liquid crystal display device according to the present embodiment is capable of improving the response speed in the first display mode of performing display in the first state, and improving the luminance in the second display mode of performing display in at least one of the second or third state. The first display mode can be used as a display mode for, for example, HMD, and the second display mode can be used as a display mode for, for example, smartphones.

It is to be noted that performing display in at least one of the second state or the third state in the second display mode means that the period of display in the second display mode: (1) is composed of only a period of display in the second state; (2) is composed of only a period of display in the third state; or (3) has a period of display in the second state and a period of display in the third state. In the case of the foregoing (3), whether the display is performed in the second state or the third state may be appropriately selected.

In the second state, no voltage is applied between the pair of counter electrodes, and the second state can thus reduce the power consumption more than the third state. Furthermore, in the third state, an alternating-current voltage is applied at the second frequency between the pair of counter electrodes, thus making the movement of the liquid crystal molecules more sensitive to the applied electric field in the third state than in the second state, and allowing the liquid crystal molecules to respond over a wider range in switching between the non-voltage application state and the voltage application state. Thus, the luminance can be further increased.

The first substrate includes an insulating substrate such as a glass substrate or a plastic substrate, with the pair of counter electrodes provided on the liquid crystal layer side of the insulating substrate.

The pair of counter electrodes serves as electrodes that generate a horizontal electric field (lateral electric field) with respect to the first substrate. Examples of the structure of the pair of counter electrodes include an in-plane switching (IPS) type electrode structure and a fringe field switching (FFS) type electrode structure. In this regard, for the pair of electrodes that have an IPS-type electrode structure, one and the other electrodes are respectively comb-tooth electrodes, which are disposed such that the comb teeth are fitted to each other. In addition, for the pair of electrodes that has an FFS type electrode structure, one of the electrodes is planar, whereas the other electrode is provided with a slit, and the latter electrode is disposed on the liquid crystal layer side of the former electrode with an insulating film interposed therebetween to be opposed to the former electrode.

The alternating-current voltage application unit applies, depending on the display mode, an alternating-current voltage (alternating-current signal) that has a predetermined frequency and a predetermined effective value between the pair of counter electrodes. The waveform of the alternating-current voltage is not limited, and examples of the waveform include a rectangular wave and a sine wave.

Specific examples of the alternating-current voltage application unit include a function generator connected to a terminal provided on the first substrate via connection means such as a line. In this case, the function generator and the liquid crystal panel are disposed separately from each other, but the two are connected by the connection means to constitute one liquid crystal display device. The function generator, which is connected to, for example, an outlet, generates an alternating-current voltage that has a predetermined frequency, a predetermined effective value, and a predetermined waveform based on a voltage supplied from the outside, and applies the alternating-current voltage between the pair of counter electrodes. The function generator may be detachably connected to a terminal provided on the first substrate via connection means. It is to be noted that in this specification, a stacked body including a first substrate, a liquid crystal layer, and a second substrate is referred to as a liquid crystal cell, and a stacked body with a pair of polarizing plates disposed so as to sandwich the liquid crystal cell is referred to as a liquid crystal panel. Although an aspect of electric power transmission by wire is described in the present embodiment, wireless electric power transmission can be also used instead of wired electric power transmission. In a case where an alternating-current voltage is transmitted from the function generator to the liquid crystal panel by wireless electric power transmission, there is no line connecting the function generator and the liquid crystal panel, but in this case, the function generator and the liquid crystal panel constitute one liquid crystal display device.

In addition, the alternating-current voltage application unit may be provided on the second substrate. In this case, for example, the alternating-current voltage application unit is connected to a battery provided in the liquid crystal display device, and the alternating-current voltage application unit generates an alternating-current voltage that has a predetermined frequency, a predetermined effective value, and a predetermined waveform based on a voltage supplied from the battery, and applies the alternating-current voltage between the pair of counter electrodes. In this regard, the first substrate and the second substrate are connected by, for example, a transfer electrode, and an alternating-current voltage is supplied from the second substrate side to the first substrate side via a transfer electrode line. More specifically, in a liquid crystal panel (for example, a rectangular liquid crystal panel) that has a liquid crystal layer sealed between a first substrate and a second substrate with a seal including conductive fine particles, a transfer electrode line connected to the seal and the first substrate and a transfer electrode line connected to the seal and the second substrate are disposed directly on and directly beneath the long-side part of the seal (seal drawing line), that is, respectively on the first substrate side and the second substrate side of the long side part of the seal, and an alternating-current signal from the second substrate side is input to the first substrate side through the transfer electrode and the conductive fine particles in the seal. Examples of the alternating-current voltage application unit provided on the second substrate include a driver circuit provided in an empty space of a TFT substrate as the second substrate.

For example, members such as a color filter, a black matrix, and an overcoat may be appropriately disposed on the liquid crystal layer side of the insulating substrate of the first substrate. As the foregoing members, conventionally known members can be used.

The second substrate includes an insulating substrate such as a glass substrate or a plastic substrate, and the switching element, the pixel electrode, and the common electrode are provided on the liquid crystal layer side of the insulating substrate.

The second substrate further includes a plurality of gate lines provided to extend in parallel with each other on the insulating substrate, and a plurality of source lines provided to extend in parallel with each other in a direction that intersects with each gate line with the insulating film interposed therebetween. The plurality of gate lines and the plurality of source lines are formed in a grid as a whole so as to partition each pixel. For example, a thin-film transistor (TFT) is disposed as the switching element at the intersection of each source line and each gate line. In addition, the pixel electrode is disposed in each region surrounded by two source lines adjacent to each other and two gate lines adjacent to each other, and the pixel electrode is electrically connected to the corresponding source line via, for example, a semiconductor layer included in the TFT.

The common electrode is an electrode formed over the entire display region, regardless of pixel boundaries. To the common electrode, a common signal kept at a constant value is supplied to keep the common electrode at a constant potential.

At least one of the pixel electrode or the common electrode has the second linear part extending in the second direction that intersects with the first direction. Such an aspect makes it possible to change the direction of the electric field applied to the liquid crystal layer, depending on the presence or absence of the voltage applied between the pixel electrode and the common electrode, in a state where a voltage is applied between the pair of electrodes, and makes it possible to switch between the voltage application state and the non-voltage application state, even in a state where a voltage is applied between the pair of electrodes.

Examples of the structure of the pixel electrode and the common electrode include the IPS-type electrode structure and the FFS-type electrode structure.

The liquid crystal layer includes liquid crystal molecules that are aligned horizontally with respect to the first substrate and the second substrate. The liquid crystal display device according to the present embodiment is adapted to control the amount of light transmission by applying a voltage to the liquid crystal layer and then changing the alignment state of the liquid crystal molecules in accordance with the applied voltage.

The liquid crystal molecules are adapted such that the anisotropy of dielectric constant (Δε) defined by the following formula has a negative value. It is to be noted that liquid crystal molecules with negative anisotropy of dielectric constant are also referred to as negative liquid crystals, whereas liquid crystal molecules with positive anisotropy of dielectric constant are also referred to as positive liquid crystals. Further, the major axis direction of liquid crystal molecules serves as the slow axis direction. In addition, the liquid crystal molecules are homogeneously aligned with no voltage applied (non-voltage application state), and the major axis direction of the liquid crystal molecules in the non-voltage application state is also referred to as the initial alignment direction of the liquid crystal molecules.

$$\Delta\varepsilon = \text{(Dielectric Constant in Major Axis Direction of Liquid Crystal Molecules)} - \text{(Dielectric Constant in Minor Axis Direction of Liquid Crystal Molecules)} \quad (L)$$

In this regard, the fact that the liquid crystal molecules are aligned horizontally with respect to the first substrate and the second substrate means that the tilt angle (including the pre-tilt angle) of the liquid crystal molecules is 0° to 5°, preferably 0° to 3°, more preferably 0° to 1° with respect to the surfaces of the first substrate and second substrate. The tilt angle of the liquid crystal molecules means an angle at which the major axis (optical axis) of the liquid crystal molecules is inclined with respect to the surfaces of the front-side polarizing plate and the back-side polarizing plate.

The liquid crystal display device according to the present embodiment performs display in any of multiple display modes including the first display mode and the second display mode. More specifically, the liquid crystal display device according to the present embodiment is capable of switching multiple display modes, and capable of performing display in a display mode appropriately selected from multiple display modes. For example, the display mode of the liquid crystal display device performing display in one of the first display mode or the second display mode can be changed to perform display in the other mode.

The first state where the alternating-current voltage application unit applies an alternating-current voltage at the first frequency between the pair of counter electrodes will be described. The first frequency is preferably a frequency of 240 Hz or lower. In the case of applying an alternating-current voltage between the pair of counter electrodes at a frequency in excess of 240 Hz, the liquid crystal molecules fail to follow the electric field generated by the applied alternating-current voltage, and then more easily translate and diffuse, thereby making it difficult for the electric field from the first substrate to regulate the alignment of the liquid crystal molecules. The first frequency adjusted to 240 Hz or lower makes it possible for the electric field from the first substrate to regulate the alignment of the liquid crystal molecules in a more forcible manner, and thus allowing the response speed to be further improved. The first frequency adjusted to a frequency of 240 Hz or lower makes it possible, for example, to adjust the mode efficiency to be described to 25% or higher, and to adjust the response speed to 7 ms or less in switching from the non-voltage application state to the voltage application state and switching from the voltage application state to the non-voltage application state. The lower limit of the first frequency is not limited, but is preferably 0.001 Hz or higher. In a case where the first frequency is less than 0.001 Hz, a homopolar voltage is kept applied for a long time, and there is thus a possibility that, for example, impurity ions in the liquid crystal cell may be adsorbed on one electrode, thereby burning out the liquid crystal cell. The first frequency is more preferably 10 Hz or higher. Such an aspect can suppress flickers.

The first frequency is still more preferably a frequency in the range of 0.001 Hz or higher and 10 Hz or lower, and 60 Hz or higher and 240 Hz or lower. In the case of applying an alternating-current voltage between the pair of counter electrodes at a frequency of higher than 10 Hz and lower than 60 Hz, flickers (luminance variation with time) may be caused, but the first frequency adjusted to a frequency in the range of 0.001 Hz or higher and 10 Hz or lower, and 60 Hz or higher and 240 Hz or lower allows flickers to be suppressed, in addition to allowing the response speed to be improved as described above.

The effective value of the alternating-current voltage applied in the first state is preferably 5 V or higher and 20 V or lower. If the effective value of the alternating-current voltage applied in the first state exceeds 20 V, an increase in power consumption and a decrease in mode efficiency will not be acceptable, and if the effective value is less than 5 V, the response speed may be improved insufficiently. The effective value of the alternating-current voltage applied in the first state is more preferably 7 V or higher and 15 V or lower, still more preferably 9 V or higher and 12 V or lower. The effective value of the alternating-current voltage applied in the first state is particularly preferably about 10 V. Such an aspect can sufficiently improve the response speed, while reducing the power consumption and minimizing the decrease in mode efficiency.

In the first display mode, the first frequency is preferably equal to the frequency of the alternating-current voltage applied between the pixel electrode and the common electrode. Such an aspect makes it possible to suppress flickers, thereby reducing eye fatigue due to keeping visual recognition.

The fact that the first frequency is equal to the frequency of the alternating-current voltage applied between the pixel electrode and the common electrode is considered also including cases where the first frequency is substantially equal to the frequency of the alternating-current voltage applied between the pixel electrode and the common electrode. The fact that the first frequency is equal to the frequency of the alternating-current voltage applied between the pixel electrode and the common electrode specifically refers to a case where the difference between the two frequencies is 0.01 Hz or lower.

The second state where no voltage is applied between the pair of counter electrodes will be described. The fact that no voltage is applied between the pair of counter electrodes is considered also including a case where substantially no voltage is applied between the pair of counter electrodes. The second state where no voltage is applied between the pair of counter electrodes refers to, specifically, a state where the alternating-current voltage between the pair of counter electrodes, applied by the alternating-current voltage application unit, has an effective value of 0.5 V or lower. In a case where an alternating-current voltage with an effective value of 0.5 V or lower is applied in the second state, the frequency is preferably 1 Hz or higher. The alternating-current voltage with such a frequency is suitable for a liquid crystal display device for both HMD and smartphone. Furthermore, in a case where an alternating-current voltage with an effective value of 0.5 V or lower is applied in the second state, the frequency is preferably 120 Hz or lower. Such an aspect, in the case of providing the liquid crystal display device according to the present embodiment with a scan-type backlight, makes it possible to synchronize the pair of driven counter electrodes with the driven scan-type backlight, and thus allowing the flicker to be reduced. The frequency of the alternating-current voltage applied to the pair of counter electrodes and the frequency of the scan-type backlight are both preferably about 90 Hz, and can be about 120 Hz at maximum.

The third state where the alternating-current voltage application unit applies an alternating-current voltage at the second frequency that is higher than the first frequency between the pair of counter electrodes will be described. The second frequency is preferably a frequency of 300 Hz or higher. In the case of applying an alternating-current voltage between the pair of counter electrodes at a frequency of less than 300 Hz, the alignment of more liquid crystal molecules is forcibly regulated by the electric field from the first substrate, thus reducing the luminance, but the frequency adjusted to 300 Hz or higher causes the liquid crystal molecules to fail to follow the electric field from the first substrate, and then more easily translate and diffuse. As a result, the liquid crystal molecules are much more likely to fluctuate (more likely to be loosened), thereby allowing more liquid crystal molecules to respond in switching between the voltage application state and the non-voltage application state. Thus, the luminance can be further improved. The second frequency adjusted to a frequency of 300 Hz or higher makes it possible, for example, to adjust the mode efficiency to be described to 75% or higher, while making response speed comparable to that of a liquid crystal display device without a pair of counter electrodes disposed and with a positive liquid crystal used. In addition, the upper limit value of the second frequency is preferably 100 kHz or lower, more preferably 10 kHz or lower. Such an aspect can reduce the power consumption.

The effective value of the alternating-current voltage applied in the third state is preferably 1 V or higher and 20 V or lower. If the effective value of the alternating-current voltage applied in the third state exceeds 20 V, an increase in power consumption and a decrease in mode efficiency will not be acceptable, and if the effective value is less than 1 V, the response speed may fail to be improved. The effective value of the alternating-current voltage applied in the third state is more preferably 2 V or higher and 15 V or lower, still more preferably 3 V or higher and 10 V or lower.

The second frequency and the effective value of the alternating-current voltage in the third state preferably satisfy the relation of the following formula 1. The luminance of the liquid crystal display device according to the present embodiment in which the second frequency and the effective value of the alternating-current voltage in the third state fail to satisfy the relation of the following formula 1 may be lower than the luminance of a smartphone-mode liquid crystal display device with negative liquid crystals used without the pair of counter electrodes, but the liquid crystal display device according to the present embodiment which satisfies the relation of the following formula 1 makes it possible to achieve a luminance that is equal to or higher than that of a smartphone-mode liquid crystal display device with negative liquid crystals used without the pair of counter electrodes.

$$HS \geq 38 \times VS^2 - 110 \times VS + 286 \qquad \text{(Formula 1)}$$

(In the formula, HS represents the second frequency in the third state, and VS represents the effective value of the alternating-current voltage in the third state.)

Hereinafter, liquid crystal display devices according to other embodiments of the present invention will be described more specifically with reference to the drawings. It is to be noted that in the following description, the same parts or parts that have similar functions are appropriately denoted by the same reference numerals through different drawings, and repeated descriptions thereof are omitted appropriately.

Embodiment 1

(1) Overview of Configuration of Liquid Crystal Display Device

FIG. 1 is a schematic perspective view of a liquid crystal display device according to Embodiment 1. The liquid crystal display device 1 according to Embodiment 1 includes, as shown in FIG. 1, a liquid crystal layer 30 including the liquid crystal molecules with negative anisotropy of dielectric constant ($\Delta\varepsilon$) between a counter substrate 10I as the first substrate and a TFT substrate 20F as the second substrate, including a thin-film transistor (TFT) 22 as the switching element. The counter substrate 10I is located on the front side (display side), and the TFT substrate 20F is located on the back side. The initial alignment of the liquid crystal molecules is set in a direction that is horizontal to the counter substrate 10I and the TFT substrate 20F.

Figure 2:
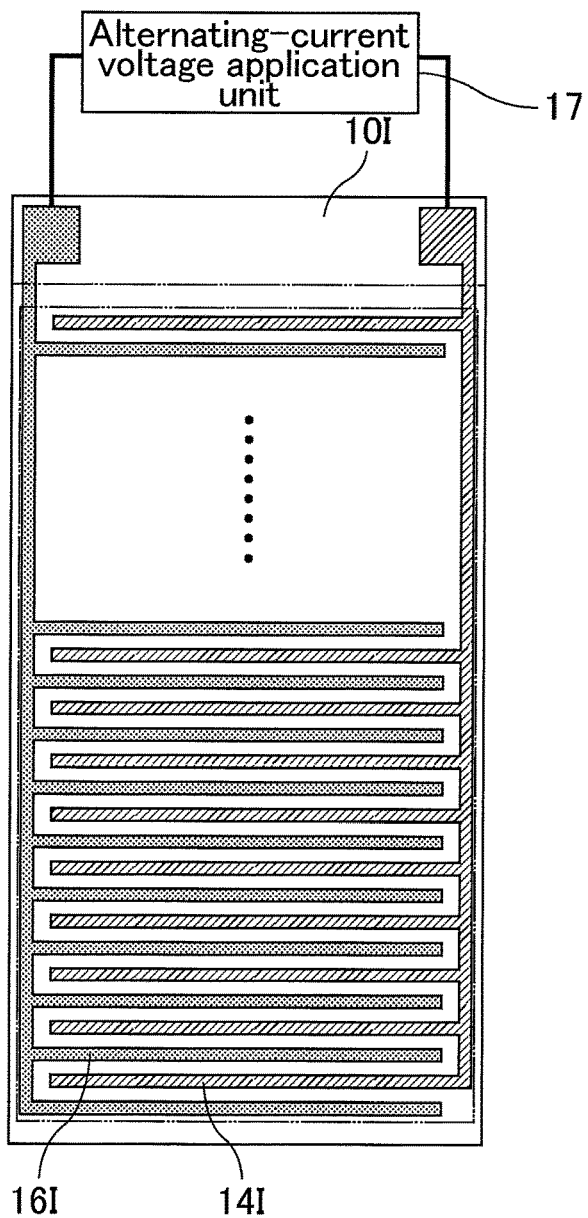
FIG. 2 is a schematic plan view of a counter substrate included in the liquid crystal display device according to Embodiment 1.

FIG. 2 is a schematic plan view of the counter substrate included in the liquid crystal display device according to Embodiment 1. As shown in FIGS. 1 and 2, the counter substrate 10I has, as the pair of counter electrodes that have an IPS-type electrode structure, a pair of comb-tooth electrodes that have comb teeth fitted to each other, on an insulating substrate 11 on the side of the liquid crystal layer 30. Hereinafter, one of the pair of comb-tooth electrodes is referred to as a first counter electrode 14I, and the other thereof is referred to as a second counter electrode 16I. The first and second counter electrodes 14I, 16I each have a plurality of parallel comb-tooth parts (first linear parts), and the respective comb-tooth parts are alternately arranged at a constant interval (also referred to as a space or a slit). Applying a voltage between the first and second counter electrodes 14I and 16I generates a horizontal electric field (lateral electric field) with respect to the counter substrate 10I in the liquid crystal layer 30 near the space.

In the IPS-type electrode structure provided for the counter substrate 10I, the width (electrode widths) 14W or 16W per comb tooth constituting the comb-tooth part is preferably 0.3 µm or more and 1.2 µm or less. Such an embodiment makes it possible for the electric field from the counter substrate 10I to immobilize also the liquid crystal molecules located near the center in the width direction of the electrode, and thus allows the response speed to be further improved in the first display mode. Furthermore, the interval (electrode gap) SW1 between the facing comb teeth (the comb teeth of the first counter electrode 14I and the comb teeth of the second counter electrode 16I) is preferably 0.9 µm or more and 1.8 µm or less. Such an embodiment makes it possible for the electric field from the counter substrate 10I to immobilize also the liquid crystal molecules located near the center in the width direction of the electrode gap, and thus allows the response speed to be further improved in the first display mode.

The counter substrate 10I further includes an alternating-current voltage application unit 17 that applies an alternating-current voltage to the first and second counter electrodes 14I and 16I. According to the present embodiment, the second counter electrode 16I is connected to a common electrode 24F to be described, and grounded, and a constant potential is supplied to the second counter electrode 16I.

As shown in FIG. 1, the TFT substrate 20F includes a pixel electrode 26F and a common electrode 24F that have an FFS-type electrode structure. Specifically, the pixel electrode 26F which is a planar electrode and the common electrode 24F with electrode slits formed are provided in combination. The pixel electrode 26F has a plurality of parallel electrode slits (non-electrode formation sections) 26S formed, and has a configuration where linear parts (second linear parts) 26L between the electrode slits 26S are arranged at regular intervals.

In the FFS-type electrode structure provided for the TFT substrate 20F, the width (electrode width) 26W per linear part 26L is preferably 2 µm or more and 10 µm or less, and set to, for example, 4 µm. Furthermore, the width (electrode gap) SW2 of the electrode slit 26S is preferably 3 µm or more and 8 µm or less, and set to, for example, 4 µm.

The extending direction (first direction D1) of the comb-tooth parts provided for the first and second counter electrodes 14I, 16I and the extending direction (second direction D2) of the linear part 26L provided for the pixel electrode 26F are not parallel or vertical, but set to make a predetermined angle θ within the range of more than 0° and less than 90°. The angle θ, which is preferably in a range of 60° or more and 85° or less, is set to, for example, 75°.

The pixel electrode 26F is electrically connected to a drain electrode of the TFT 22 disposed on the lower layer (on the side of the insulating substrate 21) through a contact hole (through hole) 27. The common electrode 24F is disposed below the pixel electrode 26F with a dielectric layer (insulating film) 25 interposed therebetween. The common electrode 24F is disposed over the entire surface of the insulating substrate 21 with an insulating film 23 interposed therebetween, except for the opening for forming the contact hole 27. Applying a voltage between the pixel electrode 26F and the common electrode 24F generates an electric field (lateral electric field or oblique electric field) substantially horizontal with respect to the TFT substrate 20F in the liquid crystal layer 30 near the electrode slits 26S.

The liquid crystal display device further includes a source driver electrically connected to the source lines and a gate driver electrically connected to the gate lines, and a controller. The gate driver sequentially supplies scanning signals to the gate lines, based on control by the controller. The source driver supplies a data signal to the source line, based on control by the controller at a timing when the TFT is turned into a voltage application state by the scanning signal. Each pixel electrode is set to a potential corresponding to a data signal supplied via a corresponding TFT, and a fringe electric field is generated between the pixel electrode and the common electrode to rotate the liquid crystal molecules of the liquid crystal layer. In this way, the magnitude of the voltage applied between the pixel electrode and the common electrode is controlled to change the retardation of the liquid crystal layer, and then control the transmission and non-transmission of light. As a result, gray display or white display is performed in the voltage application state, and black display is performed in the non-voltage application state.

Horizontal alignment films (not shown) are disposed on the outermost surfaces of the counter substrate 10I and TFT substrate 20F on the sides closer to the liquid crystal layer 30, so as to cover at least the entire display region. The horizontal alignment films have only to align the liquid crystal molecules in the liquid crystal layer 30 substantially horizontally with respect to the surfaces of the films. The pre-tilt angle of liquid crystal molecules 31 should be within a range that achieves desired viewing angle characteristics, but is preferably close to 0°. Photo-alignment films that are allowed to exhibit alignment characteristics by irradiation with light (including ultraviolet rays) are suitable as a material for the horizontal alignment films. The photo-alignment films are also capable of making the pre-tilt angle less than 1°. In addition, common alignment films that are allowed to exhibit alignment characteristics by rubbing treatment may be used. Even such common alignment films are capable of making the pre-tilt angle about 1° to 2°.

The liquid crystal layer 30 includes liquid crystal molecules with negative anisotropy of dielectric constant (As). When liquid crystal molecules with positive anisotropy of dielectric constant are used, there is a possibility that in the voltage application state, the liquid crystal molecules are unintentionally vertically aligned due to the influence of an electric field generated between the electrodes 14I and 16I provided on the counter substrate 10I and the electrodes 24F and 26F provided on the TFT substrate 20F, thereby causing alignment disorder. The use of the liquid crystal molecules 31 with negative anisotropy of dielectric constant can reliably prevent such alignment disorder as mentioned above.

The thickness of the liquid crystal layer 30 is preferably 2 μm or more and 5 μm or less, and set to 3 μm, for example.

Polarizing plates 60 and 61 are disposed respectively on the front side of the counter substrate 10I and the back side of the TFT substrate 20F. The absorption axes of the polarizing plates 60 and 61 are set to satisfy a relation of crossed Nicols, and the absorption axis of one polarizing plate 60 or 61 has a parallel relation (parallel to the first direction D1) with the comb-tooth parts provided for the first and second counter electrodes 14I and 16I, whereas the absorption axis of the other polarizing plate 61 or 60 has a perpendicular relation (perpendicular to the first direction D1) with the comb-tooth parts provided for the first and second counter electrodes 14I and 16I.

Optical compensation films may be disposed between the counter substrate 10I and the polarizing plate 60 and between the TFT substrate 20F and the polarizing plate 61. The axial directions of the optical compensation films preferably have a parallel relation (parallel to the first direction D1) with the comb-tooth parts provided for the first and second counter electrodes 14I and 16I, from the viewpoint of optimizing optical compensation in the initial alignment state.

(2) Method for Driving Liquid Crystal Display Device

In a state where the power supply of the liquid crystal display device 1 is turned off, that is, no voltage is applied to any of the first counter electrode 14I and second counter electrode 16I of the counter substrate 10I and the pixel electrode 26F and common electrode 24F of the TFT substrate 20F, the liquid crystal molecules are aligned parallel to the counter substrate 10I and the TFT substrate 20F. In this case, the liquid crystal molecules are regulated by the horizontal alignment films to have a parallel relation (parallel to the first direction D1) or a perpendicular relation (perpendicular to the first direction D1) with the comb-tooth parts provided for the first and second counter electrodes 14I and 16I.

In a state where the liquid crystal display device 1 is turned on, the first display mode and the second display mode can be switched to display images. The first display mode refers to a display mode in which display is performed in the first state where an alternating-current voltage is applied at the first frequency between the first counter electrode 14I and the second counter electrode 16I. The second display mode refers to a display mode in which display is performed in any of the second state where no voltage is applied between the first counter electrode 14I and the second counter electrode 16I; and the third state where an alternating-current voltage is applied at the second frequency that is higher than the first frequency between the first counter electrode 14I and the second counter electrode 16I. Details of each display mode will be described below.

Figure 3:
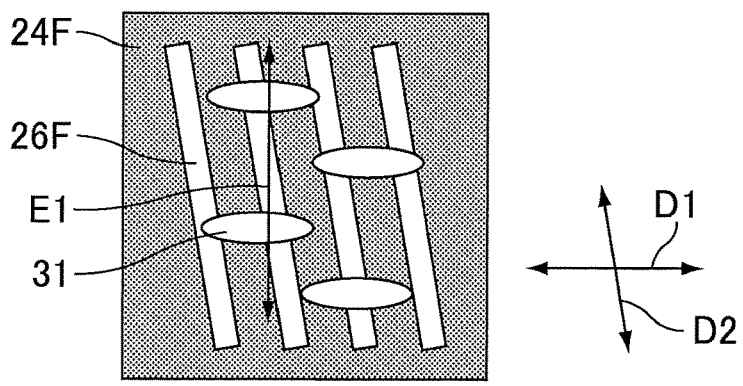
FIG. 3 is a diagram related to the liquid crystal display device according to Embodiment 1, and is a schematic plan view illustrating a non-voltage application state in a first display mode.
Figure 4:
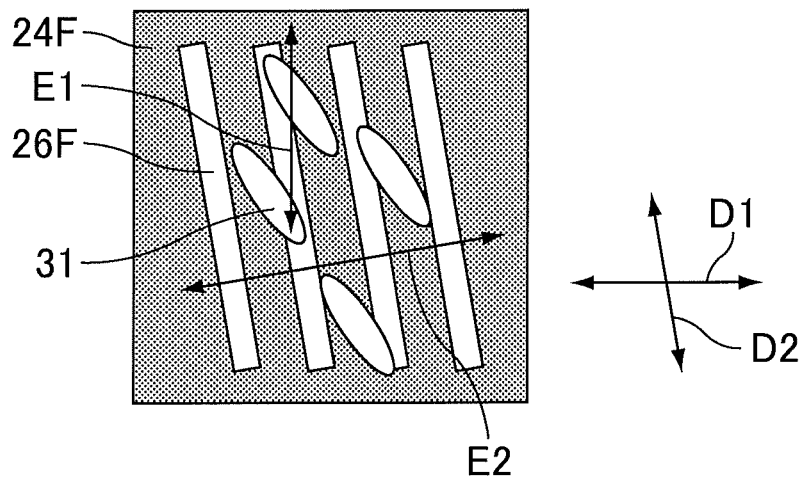
FIG. 4 is a diagram related to the liquid crystal display device according to Embodiment 1, and is a schematic plan view illustrating a voltage application state in the first display mode.
Figure 5:
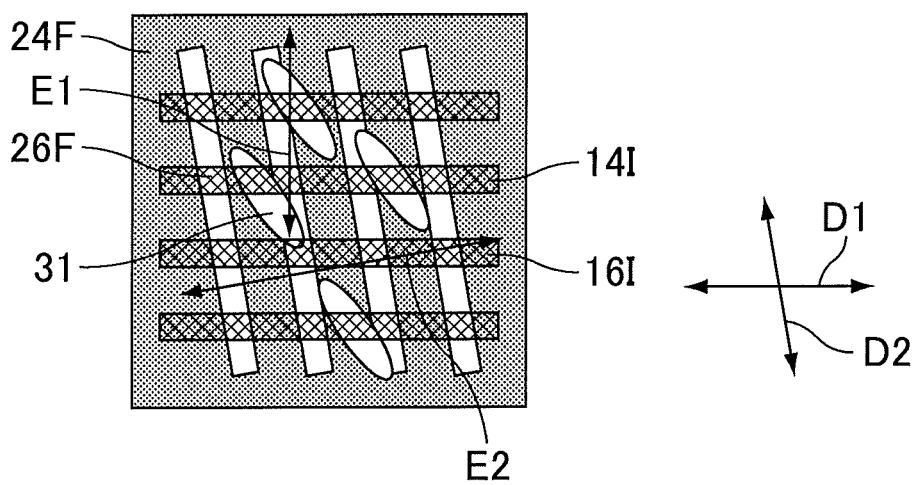
FIG. 5 is a diagram related to the liquid crystal display device according to Embodiment 1, and is a schematic plan view illustrating a voltage application state in the first display mode.

FIG. 3 is a diagram related to the liquid crystal display device according to Embodiment 1, and is a schematic plan view illustrating a non-voltage application state in the first display mode. FIGS. 4 and 5 are diagrams related to the liquid crystal display device according to Embodiment 1, and are schematic plan views illustrating a voltage application state in the first display mode. FIG. 5 is a schematic plan view in which the first and second counter electrodes are also shown in the schematic plan view of FIG. 4. In the first state of the first display mode, an alternating-current voltage is applied at a frequency of 240 Hz or lower between the first counter electrode 14I and the second counter electrode 16I, and an electric field E1 from the counter substrate 10I thus affects the alignment of the liquid crystal molecules 31. For that reason, in the case of a non-voltage application state in the first display mode, as shown in FIG. 3, the alignment of the liquid crystal molecules 31 is regulated under the influence of the electric field E1 from the counter substrate 10I. In addition, in a voltage application state, as shown in FIGS. 4 and 5, the alignment of the liquid crystal molecules 31 is regulated under the influence of the combined electric field of the electric field E1 from the counter substrate 10I and an electric field E2 from the TFT substrate 20F.

Figure 6:
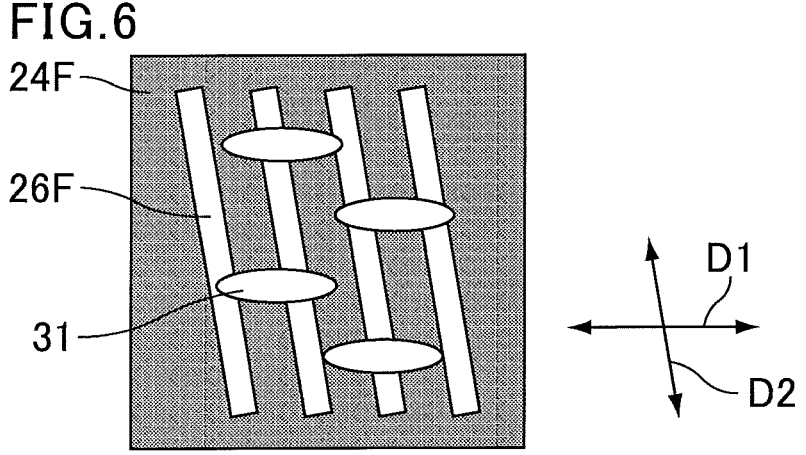
FIG. 6 is a diagram related to the liquid crystal display device according to Embodiment 1, and is a schematic plan view illustrating a non-voltage application state in a second display mode.
Figure 7:
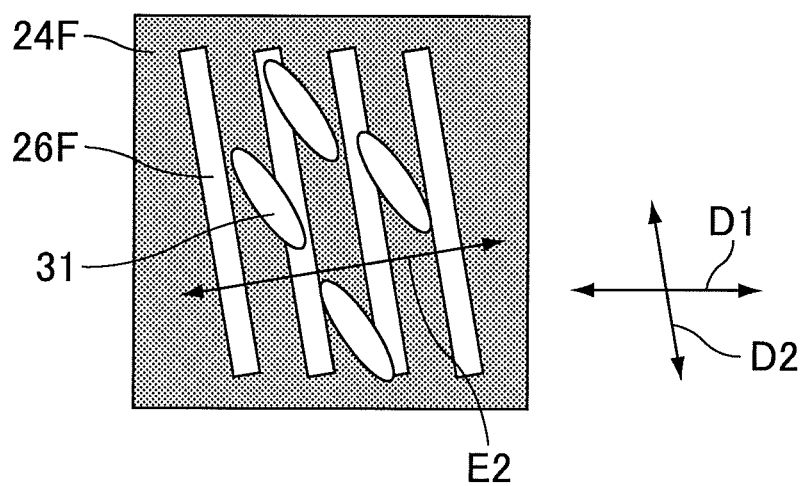
FIG. 7 is a diagram related to the liquid crystal display device according to Embodiment 1, and is a schematic plan view illustrating a voltage application state in the second display mode.

FIG. 6 is a diagram related to the liquid crystal display device according to Embodiment 1, and is a schematic plan view illustrating a non-voltage application state in the second display mode. FIG. 7 is a diagram related to the liquid crystal display device according to Embodiment 1, and is a schematic plan view illustrating a voltage application state in the second display mode. In the second state in the second display mode, the counter substrate 10I has no electric field generated, because no voltage is applied between the first counter electrode 14I and the second counter electrode 16I. In addition, in the third state in the second display mode, an alternating-current voltage is applied at a frequency of 300 Hz or higher between the first counter electrode 14I and the second counter electrode 16I, and an electric field from the counter substrate 10I thus does not affect (or hardly affects) the alignment of the liquid crystal molecules 31. For that reason, in the case of a non-voltage application state in the second display mode, as shown in FIG. 6, the liquid crystal molecules 31 are aligned by the horizontal alignment films to be parallel to the comb-tooth parts provided for the first and second counter electrodes 14I and 16I (parallel to the first direction D1). In addition, in a voltage application state, as shown in FIG. 7, the alignment of the liquid crystal molecules 31 is regulated under the influence of the electric field E2 from the TFT substrate 20F.

As described above, in the first display mode, the liquid crystal molecules 31 are always forcibly regulated by the electric field, thus allowing the response speed to be improved. In this regard, in the first display mode, the electric field from the counter substrate 10I always regulates the alignment of the liquid crystal molecules 31, thus causing the liquid crystal molecules 31 near the counter substrate 10I to be immobilized without responding. On the other hand, in the second display mode, the liquid crystal molecules 31 are not affected by the electric field E1 from the counter substrate 10I, and in the second display mode, the alignment of more liquid crystal molecules 31 is changed by the electric field E2 from the TFT substrate 20F than in the first display mode. Thus, in the second display mode, the luminance can be improved more than in the first display mode.

Embodiment 2

In the present embodiment, features unique to the present embodiment will be mainly described, and the description of contents overlapped with the embodiment mentioned above will be omitted. The liquid crystal display device according to the present embodiment has the same configuration as the liquid crystal display device according to Embodiment 1, except for the introduction of a system for switching the polarity of the voltage applied between the pixel electrode and the common electrode.

In the case of driving the liquid crystal display device according to Embodiment 1 mentioned above by applying, for example, an alternating-current voltage with an effective value of 12 V and a frequency of 0.01 Hz between the first and second counter electrodes (the first state), and applying a voltage of 0 V in a non-voltage application state and an alternating-current voltage with an effective value of 5 V and a frequency of 60 Hz in a voltage application state between the pixel electrode and the common electrode, it is possible to keep the power consumption low, but flickers may be observed. In order to suppress the foregoing flickers, a system that detects, when the average luminance on a screen of the liquid crystal display device is changed by 5 to 10% or higher, the change with photosensors, and switches the polarity of the voltage applied between the pixel electrode and the common electrode is introduced into the liquid crystal display device according to the present embodiment. The voltage polarity is assumed to be changed once every 10 seconds, and is actually changed to take about 1 second in a manner that draws an S-shaped curve. This change makes it possible to control the liquid crystal molecules located closer to the TFT substrate into a preferred alignment state, thereby suppressing flickers (more than in a case where the frequency is fixed), and thus making it possible to achieve an HMD mode which eliminates eye fatigue even in keeping on visual recognition. In this regard, the system for switching the polarity of the voltage is a system which is used for the correction of the average luminance on the screen, and in order to control the system, it is necessary to perform driving with the polarity reversed in individual screen split regions. It is to be noted that the average luminance on the screen is determined with a reference image displayed, and the change in the average luminance on the screen refers to a shift in average luminance from the initial state where the liquid crystal display device is activated. In addition, the photosensors are built at equal intervals in the liquid crystal display device (for example, between the counter substrate and the polarizing plate on the front side).

In the liquid crystal display device according to the present embodiment, the polarity of the voltage applied between the pixel electrode and the common electrode is switched by the system mentioned above, and in addition to the voltage applied between the pixel electrode and the common electrode, the polarity of the voltage applied between the pair of counter electrodes is also preferably switched by the system. Such an aspect makes it possible to control not only the liquid crystal molecules located closer to the TFT substrate, but also the liquid crystal molecules located closer to the counter substrate, into a preferred alignment state, thereby allowing flickers to be further suppressed.

The polarity of the voltage applied between the pixel electrode and the common electrode is switched according to the present embodiment, but instead, flickers can be suppressed also by changing the luminance of a backlight slightly in synchronization. Specifically, the luminance of the backlight is decreased in a screen region with significant flickers, and the luminance of the backlight is increased in a region with few flickers. In addition, if the backlight is synchronized in conjunction with writing by the TFT, flickers and lines with dynamic display defects can be reduced. The backlight synchronization can be performed with the use of, for example, a local dimming backlight (edge light method).

Embodiment 3

In the present embodiment, features unique to the present embodiment will be mainly described, and the description of contents overlapped with the embodiment mentioned above will be omitted. The liquid crystal display device according to the present embodiment has the same configuration as the liquid crystal display device according to Embodiment 1, except for the introduction of a system for switching the polarity of the voltage applied between the pixel electrode and the common electrode.

As described above, in the case of driving the liquid crystal display device according to Embodiment 1 mentioned above by applying, for example, an alternating-current voltage with an effective value of 12 V and a frequency of 0.01 Hz between the first and second counter electrodes (the first state), and applying a voltage of 0 V in a non-voltage application state and an alternating-current voltage with an effective value of 5 V and a frequency of 60 Hz in a voltage application state between the pixel electrode and the common electrode, it is possible to keep the power consumption low, but flickers may be observed. In order to suppress the foregoing flickers, a system that detects, with photosensors, the fact that about 1 to 10% of the screen of the liquid crystal display device is switched, and switches the polarity of the voltage applied between the pixel electrode and the common electrode is introduced into the liquid crystal display device according to the present embodiment. The voltage polarity is assumed to be changed once every 10 seconds, and is actually changed to take about 1 second in a manner that draws an S-shaped curve. This change makes it possible to control the liquid crystal molecules located closer to the TFT substrate into a preferred alignment state, thereby suppressing flickers (more than in a case where the frequency is fixed), and thus making it possible to achieve an HMD mode which eliminates eye fatigue even in keeping on visual recognition.

A voltage with an polarity inverted is applied not only at the timing at which about 1 to 10% of the screen of the liquid crystal display device according to the present embodiment is switched, but also, for example, the polarity may be switched at the timing of switching by 10%, 20%, 90%, and 100% of the full screen, thereby allowing flickers for each screen split region to be suppressed each time. In this regard, 1 to 10% of the screen indicates a state where 1 to 10% of the full screen is rewritten after the liquid crystal display device is turned into a voltage application state, and in the case of scanning from the top of the screen, 10% of the screen corresponds to the upper tenth area of the screen.

In the liquid crystal display device according to the present embodiment, the polarity of the voltage applied between the pixel electrode and the common electrode is switched by the system mentioned above, and in addition to the voltage applied between the pixel electrode and the common electrode, the polarity of the voltage applied between the pair of counter electrodes is also preferably switched by the system. Such an aspect makes it possible to further suppress flickers.

The polarity of the voltage applied between the pixel electrode and the common electrode is switched according to the present embodiment, but instead, flickers can be suppressed also by changing the luminance of a backlight slightly in synchronization.

Embodiment 4

In the present embodiment, features unique to the present embodiment will be mainly described, and the description of contents overlapped with the embodiment mentioned above will be omitted. The liquid crystal display device according to the present embodiment has the same configuration as the liquid crystal display device according to Embodiment 1, except that the pair of electrodes (pixel electrode and common electrode) provided on the TFT substrate is driven in synchronization with the pair of counter electrodes provided on the counter substrate.

In the liquid crystal display device according to the present embodiment, the pixel electrode and the common electrode are driven in synchronization with the pair of counter electrodes by applying, for example, an alternating-current voltage with an effective value of 10 V and a frequency of 60 Hz between the first and second counter electrodes (the first state), and applying a voltage of 0 V in a non-voltage application state and an alternating-current voltage with an effective value of 5 V and a frequency of 60 Hz in a voltage application state between the pixel electrode and the common electrode. In a case where the pair of electrodes (pixel electrode and common electrode) provided on the TFT substrate is driven out of synchronization with the pair of counter electrodes provided on the counter substrate, lines with dynamic display defects are observed. Synchronizing the two pairs as in this embodiment, however, applies electric fields without a timing shift from the TFT substrate and the counter substrate, thus suppressing the above-mentioned display defects (as compared with a case out of synchronization), and then making it possible to provide an HMD mode which eliminates eye fatigue even in keeping on visual recognition. In this regard, driving the pixel electrode and the common electrode in synchronization with the pair of counter electrodes refers to driving the both electrode pairs at the same frequency and synchronizing the polarity switching. The voltages of the both pairs may have the same polarity, which is positive or negative, and the pairs have only to be driven at the same frequency from the same time. Thus, the electrode pair (pixel electrode and common electrode) provided on the TFT substrate and the pair of counter electrodes provided on the counter substrate continue to be synchronized as long as the device is kept in a voltage application state. It is to be noted that while the both electrode pairs are driven in synchronization at the frequency of 60 Hz according to the present embodiment, it is conceivable that flickers can be reduced by driving the both electrode pairs in synchronization at a frequency of 1 Hz or lower.

Embodiment 5

In the present embodiment, features unique to the present embodiment will be mainly described, and the description of contents overlapped with the embodiment mentioned above will be omitted. The liquid crystal display device according to the present embodiment has the same configuration as the liquid crystal display device according to Embodiment 1, except for changing the frequency of the alternating-current voltage applied to the pair of counter electrodes.

According to the present embodiment, the liquid crystal display device is driven by applying, for example, an alternating-current voltage with an effective value of 10 V between the first and second counter electrodes, and applying a voltage of 0 V in a non-voltage application state and an alternating-current voltage with an effective value of 5 V and a frequency of 60 Hz in a voltage application state between the pixel electrode and the common electrode. In this regard, the frequency of the alternating-current voltage applied between the first and second counter electrodes is sequentially changed to 60 Hz, 90 Hz, 180 Hz, 60 Hz, 90 Hz, 120 Hz . . . (the first state). Such an aspect suppresses flickers (more than in a case where the frequency is fixed), thus making it possible to provide an HMD mode which eliminates eye fatigue even in keeping on visual recognition. According to the present embodiment, flickers can be suppressed by changing to a frequency at which flickers are unlikely to be visually recognized (e.g., double-speed driving in a manner that suppresses variations) at the timing when one-screen scanning is completed, i.e., when flickers start to appear significantly.

Modification Example 1 of Embodiments 1 to 5

While liquid crystal molecules with negative anisotropy of dielectric constant are used in Embodiments 1 to 5 mentioned above, liquid crystal molecules with positive anisotropy of dielectric constant may be used instead of liquid crystal molecules with negative anisotropy of dielectric constant.

As described above, the use of liquid crystal molecules with positive anisotropy of dielectric constant is believed to likely to cause alignment disorder, but have the advantage that there are adequate selections of liquid crystal molecules, allowing liquid crystal molecules to be selected depending on desired conditions. Accordingly, it is possible to use liquid crystal molecules which have excellent temperature characteristics such as high viscosity at low temperatures and liquid crystal molecules with high anisotropy of dielectric constant. For example, liquid crystal molecules with negative anisotropy of dielectric constant have $|\Delta\varepsilon|$=about 5, but some of liquid crystal molecules with positive anisotropy of dielectric constant have $|\Delta\varepsilon|$=about 20. In this regard, in the case of negative anisotropy of dielectric constant, the absolute value of the anisotropy of dielectric constant is preferably 3 to 7, and for example, an absolute value of about 4 is adopted. In the case of positive anisotropy of dielectric constant, the absolute value of the anisotropy of dielectric constant is preferably about 5 to 20, and for example, an absolute value of about 7 is adopted. The absolute value of the anisotropy of dielectric constant is desirably a large value in consideration of simply reducing the driving voltage as much as possible, but if this absolute value is excessively large, the reliability of the liquid crystal material will be typically decreased.

Modification Example 2 of Embodiments 1 to 5

While an IPS-type electrode structure is employed as the electrode structure of the counter substrate, whereas an FFS-type electrode structure is employed as the electrode structure of the TFT substrate according to Embodiments 1 to 5, an FFS-type electrode structure may be employed as the electrode structure of the counter substrate, whereas an FFS-type electrode structure may be employed as the electrode structure of the TFT substrate, an FFS-type electrode structure may be employed as the electrode structure of the counter substrate, whereas an IPS-type electrode structure may be employed as the electrode structure of the TFT substrate, or an IPS-type electrode structure may be employed as the electrode structure of the counter substrate, whereas an IPS-type electrode structure may be employed as the electrode structure of the TFT substrate. The electrode width and the electrode gap in a case where an FFS-type electrode structure is employed as the electrode structure of the counter substrate have the same preferred ranges as those in a case where an IPS-type electrode structure is employed as the electrode structure of the counter substrate. In addition, the electrode width and the electrode gap in a case where an IPS-type electrode structure is employed as the electrode structure of the TFT substrate have the same preferred ranges as those in a case where an FFS-type electrode structure is employed as the electrode structure of the TFT substrate.

The present invention will be described in more detail below with reference to examples and comparative examples, but the present invention is not to be considered limited by these examples. In addition, the liquid crystal display device according to the present invention is a liquid crystal display device capable of switching between the first display mode and the second display mode, and in the following respective examples, with attention focused on any of the first display mode and the second display mode, any one of the display modes will be described. Each of the examples is configured to be capable of displaying in the other display mode (for example, the other display mode described in the other examples).

Example 1

The liquid crystal display device according to Example 1 has an FFS-type electrode structure as the electrode structure of the counter substrate and an FFS-type electrode structure as the electrode structure of the TFT substrate in the liquid crystal display device according to Embodiment 1 mentioned above. For the FFS-type electrode structure of the TFT substrate, the electrode width was set to 2.5 μm and the electrode gap was set to 3.0 μm. Furthermore, for the FFS-type electrode structure of the counter substrate, the electrode width was set to 3.4 μm and the electrode gap was set to 3.4 μm. For the liquid crystal layer, a negative liquid crystal was used.

The liquid crystal display device according to Example 1 was driven under the following conditions. More specifically, the liquid crystal display device according to Example 1 was driven by applying an alternating-current voltage with an effective value of 0.5 V and a frequency of 60 Hz between the first and second counter electrodes (the second state), and applying a voltage of 0 V in a non-voltage application state and an alternating-current voltage with an effective value of 5 V and a frequency of 60 Hz in a voltage application state between the pixel electrode and the common electrode. In this case, it has been found that with a mode efficiency of 83% (corresponding to a luminance of 660 cd/cm$^2$), it is possible to perform bright display, thereby allowing for display suitable in the case of use as a smartphone. Furthermore, in the liquid crystal display device according to Example 1, no voltage is applied between the first and second counter electrodes, thus allowing power consumption comparable to that of a normal smartphone to be achieved. In this regard, in the case of use as a smartphone, it is preferable to achieve a mode efficiency of 83% or higher, which is a mode efficiency corresponding to a liquid crystal display device without a pair of counter electrodes disposed and with a negative liquid crystal used. It is to be noted that the mode efficiency in this specification was determined as follows.

Mode Efficiency (%)=(Maximum Luminance in crossed Nicols)/(Luminance in parallel Nicols)× 100

In this regard, the above-mentioned maximum luminance in crossed Nicols refers to the maximum luminance in the case of applying an alternating-current voltage with an effective value of 5 V between the pixel electrode and the common electrode, with a pair of polarizing plates disposed in crossed Nicols with respect to the liquid crystal cell. Furthermore, the above-mentioned luminance in parallel Nicols refers to a luminance in a non-voltage application state with a pair of polarizing plates disposed in parallel Nicols with respect to the liquid crystal cell. The luminance of the liquid crystal display device was determined with the use of a luminance meter SR-UL1 (manufactured by TOPCON CORPORATION), with the liquid crystal display device disposed on a white light source.

International Publication No. 2015/083401 discloses setting the driving frequency of the alternating-current voltage applied to the counter electrode to 10 Hz, a frequency in the range of 60 Hz to 120 Hz, or 300 Hz, and setting the voltage value to 10 V to 100 V (for example, 40 V). The liquid crystal display device in International Publication No. 2015/083901 is, because a voltage is always applied between the pair of counter electrodes, capable of a high-speed response in both of switching from a non-voltage application state to a voltage application state and switching from a voltage application state to a non-voltage application state, but is low in luminance. For that reason, the use application of the liquid crystal display device in International Publication No. 2015/083401 is limited to, for example, HMD. Moreover, the device has the problem of high power consumption.

Example 2

The liquid crystal display device according to Example 2 has the same configuration as the liquid crystal display device according to Example 1 except for the changed driving condition. More specifically, the liquid crystal display device according to Example 2 was driven by applying an alternating-current voltage with an effective value of 3 V and a frequency of 10 Hz between the first and second counter electrodes (the third state), and applying a voltage of 0 V in a non-voltage application state and an alternating-current voltage with an effective value of 5 V and a frequency of 60 Hz in a voltage application state between the pixel electrode and the common electrode. In this case, it has been found that with a mode efficiency of 90% (corresponding to a luminance of 720 cd/cm$^2$), it is possible to perform bright display, thereby allowing for display suitable in the case of use as a smartphone. Furthermore, the luminance required in the case of use as a smartphone is about 600 cd/cm$^2$, thus allowing the luminance of the backlight to be reduced by 120 cd/cm$^2$, and also allowing the power consumption to be reduced.

Example 3

The liquid crystal display device according to Example 3 has the same configuration as the liquid crystal display device according to Example 1 except for the changed driving condition. More specifically, the liquid crystal display device according to Example 3 was driven by applying an alternating-current voltage with an effective value of 8 V and a frequency of 60 Hz between the first and second counter electrodes (the first state), and applying a voltage of 0 V in a non-voltage application state and an alternating-current voltage with an effective value of 5 V and a frequency of 60 Hz in a voltage application state between the pixel electrode and the common electrode. In this regard, the mode efficiency of approximately 40% (corresponding to a luminance of 320 cd/cm$^2$) has made it possible to achieve just the right brightness for the case of use as an HMD. In addition, with the response speed of 6 ms in switching from a non-voltage application state to a voltage application state, and the response speed of 4 ms in switching from the voltage application state to the non-voltage application state, it has been found that a high-speed response can be achieved in each case, thereby allowing for use as a liquid crystal display device suited for HMD. Furthermore, no flicker was observed in the liquid crystal display device according to Example 3. It is to be noted that the response speed in this specification was determined as follows. More specifically, the maximum value of the transmittance was defined as a transmittance ratio of 100%, and the response speed in switching from the non-voltage application state to the voltage application state was regarded as the time required for the change from the transmittance ratio of 10% to the transmittance ratio of 90%, whereas the response speed in switching from the voltage application state to the non-voltage application state was regarded as the time required for the change from the transmittance ratio of 90% to the transmittance ratio of 10%. The transmittance was measured with the use of Photal (manufactured by Otsuka Electronics Co., Ltd.). In this case, the pair of electrodes provided closer to the TFT substrate was driven in synchronization with the pair of counter electrodes provided closer to the counter substrate. Furthermore, in the evaluation of the response speed in the first display mode and the evaluation of the response speed in the third state included in the second display mode, a voltage was applied to the counter electrode with the use of a function generator, and in the evaluation of the response speed in the second state included in the second display mode, no voltage was applied to the counter electrode connected to the function generator.

Example 4

The liquid crystal display device according to Example 4 has the same configuration as the liquid crystal display device according to Example 1 except for the changed driving condition. More specifically, the liquid crystal display device according to Example 4 was driven by applying an alternating-current voltage with an effective value of 10 V and a frequency of 10 Hz between the first and second counter electrodes (the first state), and applying a voltage of 0 V in a non-voltage application state and an alternating-current voltage with an effective value of 5 V and a frequency of 60 Hz in a voltage application state between the pixel electrode and the common electrode. In this regard, the mode efficiency of approximately 25% (corresponding to a luminance of 200 cd/cm$^2$) has made it possible to achieve sufficient brightness. In addition, with the response speed of 4 ms in switching from a non-voltage application state to a voltage application state, and the response speed of 3 ms in switching from the voltage application state to the non-voltage application state, it has been found that a high-speed response can be achieved in each case, thereby allowing performance preferred as HMD to be achieved. Furthermore, no flicker was observed in the liquid crystal display device according to Example 4.

Example 5

The liquid crystal display device according to Example 5 has the same configuration as the liquid crystal display device according to Example 1 except for the changed driving condition. More specifically, the liquid crystal display device according to Example 5 was driven by applying an alternating-current voltage with an effective value of 20 V and a frequency of 240 Hz between the first and second counter electrodes (the first state), and applying a voltage of 0 V in a non-voltage application state and an alternating-current voltage with an effective value of 6 V and a frequency of 60 Hz in a voltage application state between the pixel electrode and the common electrode. In this case, the response speed in switching from the non-voltage application state to the voltage application state was 1 ms, and the response speed in switching from the voltage application state to the non-voltage application state was 7 ms.

Example 6

The liquid crystal display device according to Example 6 has the same configuration as in Example 1 except for the changed driving condition and the changed electrode widths and slit widths of the first and second counter electrodes. In the liquid crystal display device according to Example 6, the electrode widths of the first and second counter electrodes were set to 0.5 μm, and the slit widths thereof were set to 1.5 μm. Furthermore, an alternating-current voltage with an effective value of 10 V and a frequency of 60 Hz was applied between the first and second counter electrodes (the first state). In the liquid crystal display device according to Example 6, with the response speed of 3 ms in switching from a non-voltage application state to a voltage application state, and the response speed of 2 ms in switching from the voltage application state to the non-voltage application state, a high-speed response can be achieved in each case. In the liquid crystal display device of Example 6, the reduced electrode widths and slid widths are believed to make it possible for the electric field from the counter substrate to immobilize also the liquid crystal molecules located near the center in the width direction of the electrode and also the liquid crystal molecules located near the center in the width direction of the slit, allowing the response speed to be further improved in the first display mode.

Examples 10-1 to 10-4, Examples 11-1 to 11-5, and Examples 12-1 to 12-4

Figure 8:
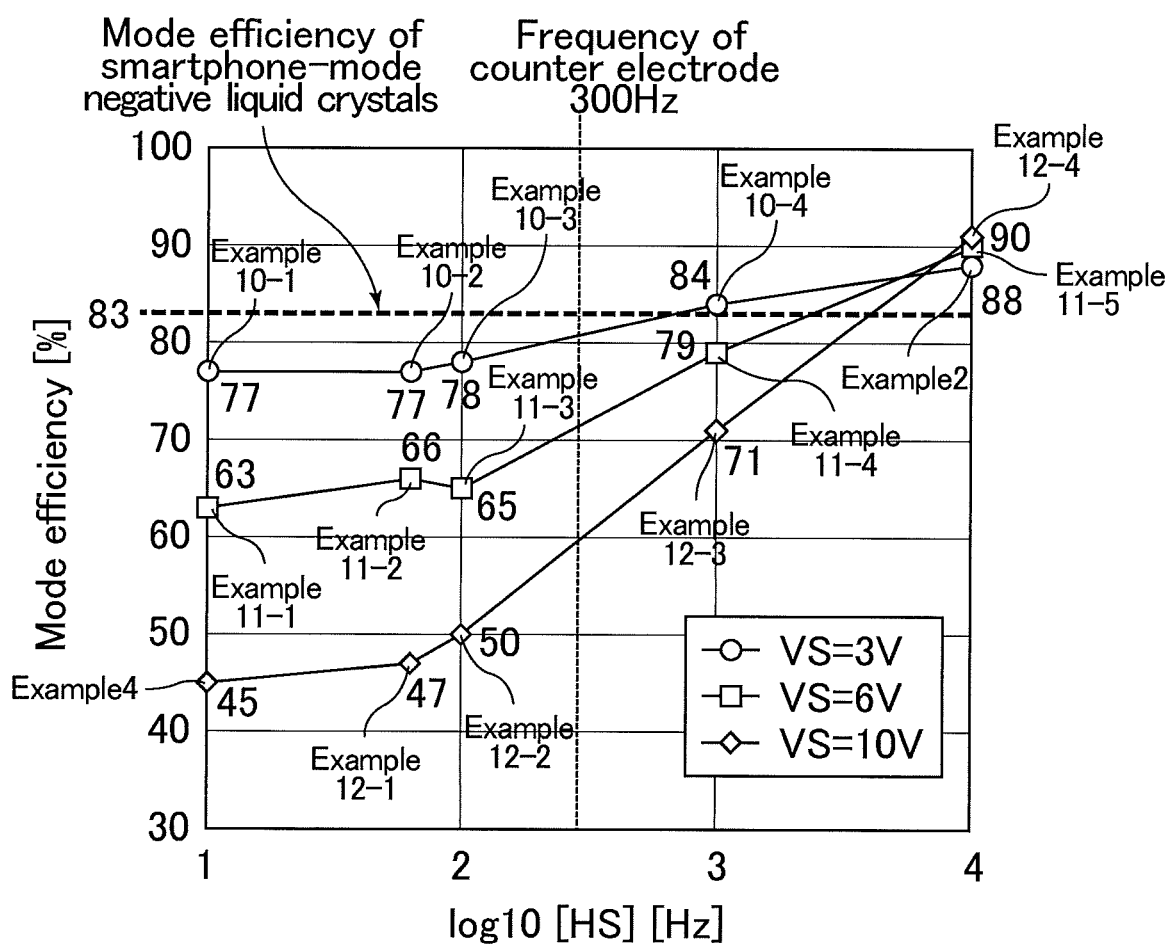
FIG. 8 is a graph related to liquid crystal display devices according to examples, and is a graph showing the relationship between the frequency of an alternating-current voltage applied to a counter electrode and the mode efficiency.

FIG. 8 is a graph related to liquid crystal display devices according to examples, and is a graph showing the relationship between the frequency of the alternating-current voltage applied to the counter electrode and the mode efficiency. The liquid crystal display devices according to Examples 10-1 to 10-4, Examples 11-1 to 11-5, and Examples 12-1 to 12-4 have the same configuration as the liquid crystal display device according to Example 2 except for the changed driving condition. More specifically, in the liquid crystal display devices according to Examples 10-1 to 10-4, an alternating-current voltage with an effective value of 3 V was applied between the first and second counter electrodes, and the frequencies of the alternating-current voltages were respectively adjusted to 10 Hz, 60 Hz, and 100 Hz, and 1 kHz. In the liquid crystal display devices according to Examples 11-1 to 11-5, an alternating-current voltage with an effective value of 6 V was applied between the first and second counter electrodes, and the frequencies of the alternating-current voltages were respectively adjusted to 10 Hz, 60 Hz, 100 Hz, 1 kHz, and 10 kHz. In the liquid crystal display devices according to Examples 12-1 to 12-4, an alternating-current voltage with an effective value of 10 V was applied between the first and second counter electrodes, and the frequencies of the alternating-current voltages were respectively adjusted to 60 Hz, and 100 Hz, 1 kHz, and 10 kHz.

As shown in FIG. 8, at any effective value of the alternating-current voltage, the mode efficiency tends to be increased by increasing the frequency. This is believed to be because when the frequency of the alternating-current voltage is increased, the liquid crystal molecules fail to follow the electric field generated by the applied alternating-current voltage, and then more easily translate and diffuse, thereby allowing more liquid crystal molecules to respond in switching between the non-voltage application state and the voltage application state. In addition, at the same frequency, the mode efficiency was higher as the effective value of the alternating-current voltage was smaller. At the frequency close to 10 kHz, however, the mode efficiency close to 90% was successfully achieved at any effective value of the alternating-current voltage. This is believed to be because at lower frequencies, as the voltage was higher, the number of liquid crystal molecules that do not move under the influence of the electric field from the first substrate was increased in switching between the non-voltage application state and the voltage application state, thus decreasing the mode efficiency, whereas at higher frequencies close to 10 kHz, liquid crystal molecules failed to follow the electric field from the first substrate, thereby making it possible to achieve a mode efficiency close to 90% at any of the voltages.

Further, from FIG. 8, it has been determined that the mode efficiency generally continues to be flat at any effective value of the alternating-current voltage in the region where the frequency of the alternating-current voltage applied between the first and second counter electrodes is 100 Hz or lower, whereas the mode efficiency is also improved with the increase in frequency at the frequency of the alternating-current voltage in excess of 100 Hz, and can be increased sufficiently (for example, to a mode efficiency of 55% or higher) at the frequency of the alternating-current voltage in the range of 300 Hz or higher. In particular, it has been found that applying an alternating-current voltage with an effective value of 5 V or lower and a frequency of 300 Hz or higher between the first and second counter electrodes makes it possible to achieve a mode efficiency equal to or higher than 75%, which is the mode efficiency of a typical liquid crystal display device with a positive liquid crystal used without a pair of counter electrodes.

In addition, it has been found that, as shown in FIG. 8, in a case where the effective value of the alternating-current voltage applied between the first and second counter electrodes is 3 V, 6 V, and 10 V, the frequencies of the alternating-current voltages are adjusted respectively to approximately 300 Hz or higher, approximately 1 kHz or higher, and approximately 3 kHz or higher, thereby making it possible to achieve a mode efficiency of 83% or higher, that is, a mode efficiency equal to or more than that of a smartphone-mode liquid crystal display device with a negative liquid crystal used without a pair of counter electrodes. When the relation between the combined frequency and effective value for the mode efficiency of 83% or higher was determined by polynomial approximation, the relation of the above-mentioned formula 1 was derived.

Figure 9:
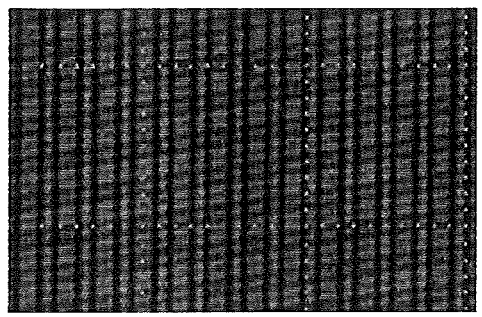
FIG. 9 is an optical micrograph of a panel of a liquid crystal display device according to Example 1.
Figure 10:
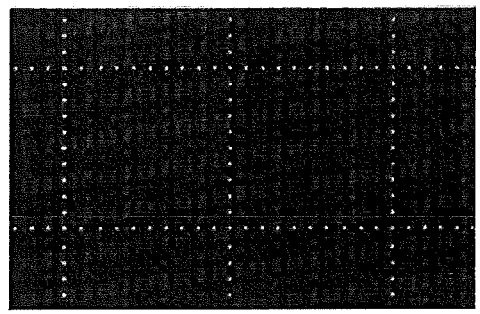
FIG. 10 is an optical micrograph of a panel of a liquid crystal display device according to Example 4.
Figure 11:
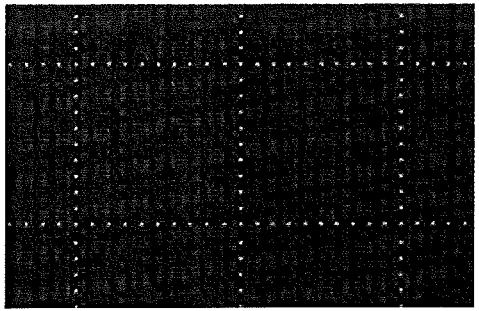
FIG. 11 is an optical micrograph of a panel of a liquid crystal display device according to Example 12-1.
Figure 12:
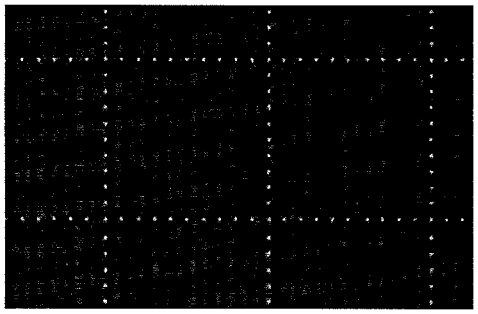
FIG. 12 is an optical micrograph of a panel of a liquid crystal display device according to Example 12-2.
Figure 13:
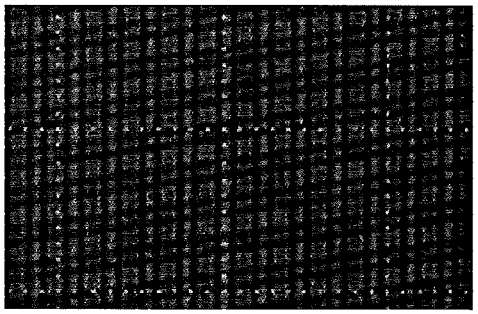
FIG. 13 is an optical micrograph of a panel of a liquid crystal display device according to Example 12-3.
Figure 14:
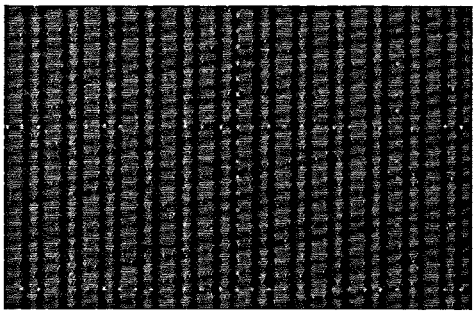
FIG. 14 is an optical micrograph of a panel of a liquid crystal display device according to Example 12-4.

FIGS. 9 to 14 are respectively optical micrographs of panels of liquid crystal display devices according to Example 1, Example 4, Example 12-1, Example 12-2, Example 12-3, and Example 12-4. As shown in FIG. 10, flickers were visually confirmed in the liquid crystal display device according to Example 4, but in Example 12-3 (FIG. 13) and Example 12-4 (FIG. 14) at the increased frequency of the voltage applied between the pair of counter electrodes, no flicker was visually confirmed, which was a result close to that in Example 1 (FIG. 9).

The respective aspects of the present invention described above may be combined appropriately without departing from the scope of the present invention.

What is claimed is:
1. A liquid crystal display device comprising:
a first substrate including a pair of counter electrodes;
a second substrate including a switching element, a pixel electrode connected to the switching element, and a common electrode, the second substrate being disposed to be opposed to the first substrate;
an alternating-current voltage application unit connected to the pair of counter electrodes; and
a liquid crystal layer that is disposed between the first substrate and the second substrate and includes liquid crystal molecules aligned horizontally with respect to the first substrate and the second substrate,
the liquid crystal display device being configured to perform display in any of multiple display modes,
at least one of the pair of counter electrodes including a first linear part extending in a first direction,
at least one of the pixel electrode or the common electrode including a second linear part extending in a second direction that intersects with the first direction,
the multiple display modes including: a first display mode of performing display in a first state where an alternating-current voltage is applied at a first frequency between the pair of counter electrodes; and
a second display mode of performing display in at least one of a second state where no voltage is applied between the pair of counter electrodes, or a third state where an alternating-current voltage is applied at a second frequency that is higher than the first frequency between the pair of counter electrodes,
wherein the second frequency and an effective value of the alternating-current voltage in the third state satisfy the relation of the following formula 1:
HS ≥38×VS$^2$ −110×VS+286 (Formula 1),
where HS represents the second frequency in the third state, and VS represents the effective value of the alternating-current voltage in the third state.
2. The liquid crystal display device according to claim 1, wherein the first frequency is a frequency of 240 Hz or lower.
3. The liquid crystal display device according to claim 1, wherein the second frequency is a frequency of 300 Hz or higher.
4. The liquid crystal display device according to claim 1, wherein the alternating-current voltage is applied between the pair of counter electrodes in synchronization with a voltage applied between the pixel electrode and the common electrode in the first display mode.

* * * * *